D. Harrison.
Railroad.

No. 95,471. Patented Oct. 6, 1869.

Witnesses:
A. W. Almqvist
Geo. W. McAbee

Inventor:
D. Harrison
per
Att'ys

United States Patent Office.

DAVID HARRISON, OF FAYETTE, MISSISSIPPI.

Letters Patent No. 95,471, dated October 5, 1869.

IMPROVED RAILWAY.

The Schedule referred to in these Letters Patent and making part of the same.

*To all whom it may concern:*

Be it known that I, DAVID HARRISON, of Fayette, in the county of Jefferson, and State of Mississippi, have invented a new and useful Improvement in Railroads; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to enable the cars to be run with safety at great speed, to give sure warning of their approach to a station, and to readily ascend steep grades, and which shall effect these objects in an easy, simple, and effective manner; and It consists in the construction and combination of the various parts, as hereinafter more fully described.

A represents the ties;
B, the rails;
C, the car-wheels;
D, the axles; and
E, the frame of a car, about the construction of which parts there is nothing new.

F are wheels, attached to the ends of the axle G, which works in brackets H, attached to the frame of the engine or car, and projecting down, so that the axle G may not interfere with the bar $c'$, connecting the wheels of the engine.

Figure 1:
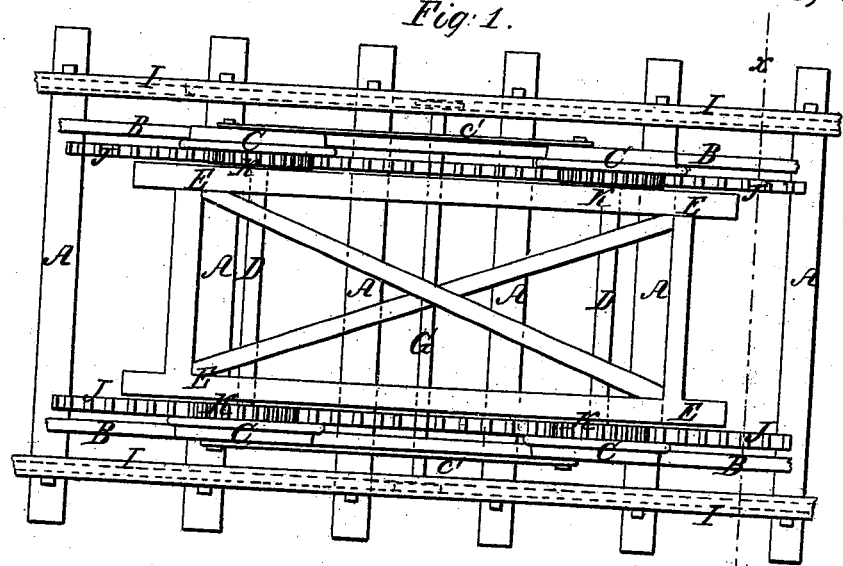
Figure 1 is a top view of a portion of a railroad-track, illustrating my improvements.
Figure 3:
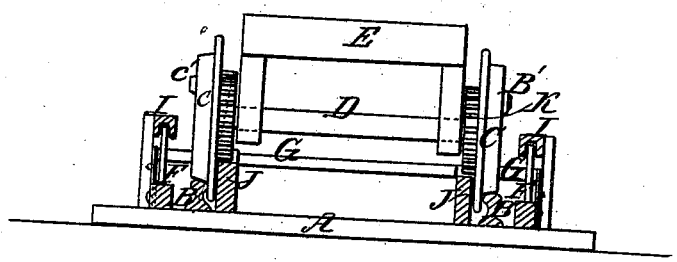
Figure 3 is a vertical cross-section of the same, taken through the line $x\,x$, fig. 1.

The axle G should be long, so that the wheels F may be outside of the wheels C, as shown in figs. 1 and 3.

In the case of ordinary cars, the wheels F may be attached to the projecting ends of the axles D.

I are rails, securely connected with and supported from the ties A, in such a position as to be directly above the wheels F.

The rails I are grooved longitudinally upon their lower sides, and are so arranged that the bottoms of said grooves may be about an inch above the wheels F when the train is at rest or running under ordinary cricumstances; but should the cars jump, the wheels F will come in contact with the rails I, and the train will be prevented from getting off the track, thus enabling the cars to be run at any desired speed with perfect safety.

At stations, and other places where not required, the rails I may be interrupted, the mouths of the grooves in the under sides of said rails being made flaring to insure the wheels F entering the said grooves.

J are toothed rails, attached to the ties A, at the inner sides of the rails B, in places where the grade is steep.

K are toothed wheels, attached to the wheels C or to the axles D, in such positions that the teeth of the wheels K may mesh into the teeth of the racks J, to assist in drawing the train up the incline.

Should the grade be so steep that there would be danger of the teeth of the wheel K slipping from the teeth of the racks J, the wheels F will come in contact with the rails I, and hold the wheels K in gear with the racks J, however steep the grade may be.

L are wires, connected with a bell at the station, and extending out a mile more or less along the track.

At suitable distances apart the wires L are interrupted, and their ends are connected to levers M, the lower ends of which are pivoted to some suitable support connected with the roadway, and their upper ends extend up into such a position that they may be struck by the projecting ends of the axle of the wheels F, to operate the wire L, and sound the bell.

Figure 2:
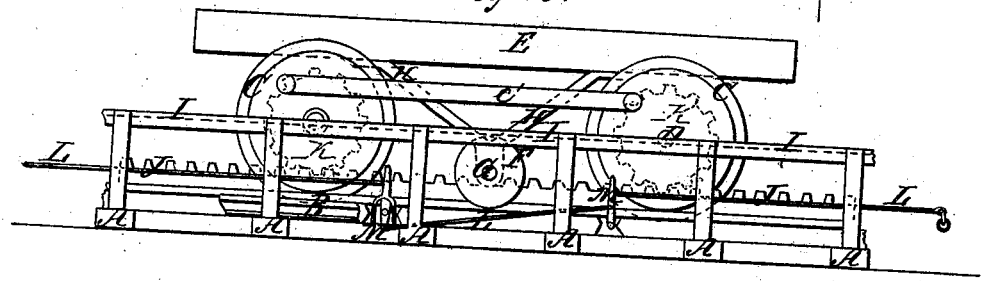
Figure 2 is a side view of the same, parts being broken away, to show the construction.

The levers M should be arranged in pairs, and their lower parts should be connected by a continuation of the wires L, as shown in fig. 2, so that when one of said levers is moved in one direction by the axle of the wheels F, and the wire L moved in one direction to sound the bell, the other lever, when struck by the said axle, may move the wire L back to its former position, ready to be again operated to again sound the bell.

By this arrangement, as the train approaches the station at speed, the bell will be kept sounding for such a length of time as will enable any who may be on the track to get out of the way, leaving the whistle to be used for giving other signals.

Having thus described my invention,

I claim as new, and desire to secure by Letters Patent—

1. The combination of the raised rails I, grooved longitudinally upon their lower sides, with the ordinary track of the railroad, substantially as herein shown and described, and for the purpose set forth.

2. The wheels F, attached to the engine or cars, when used in connection with the rails I, substantially as herein shown, and for the purposes set forth.

3. The combination of the toothed rails J, with the rails I, grooved longitudinally upon their lower sides, and with the ordinary track B of a railroad, substantially as herein shown and described, and for the purpose set forth.

4. The toothed wheels K, attached to the engine or cars, when used in connection with the toothed rails J, grooved rails I, wheels F, and the ordinary track of the railroad, substantially as herein shown and described, and for the purpose set forth.

5. The wires L and levers M, arranged and operating in connection with the wheels F, grooved rails I, and the ordinary track of the railroad, substantially as herein described and set forth.

DAVID HARRISON.

Witnesses:
B. B PADDOCK,
R. H. TRULY.